US 12,258,484 B2

United States Patent
Guo et al.

(10) Patent No.: US 12,258,484 B2
(45) Date of Patent: *Mar. 25, 2025

(54) PROCESS FOR PRODUCING A COATED SUBSTRATE

(71) Applicant: Dow Global Technologies LLC, Midland, MI (US)

(72) Inventors: Yinzhong Guo, Lake Jackson, TX (US); Manesh Nadupparambil Sekharan, Freeport, TX (US); Yuming Lai, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 857 days.

This patent is subject to a terminal disclaimer.

(21) Appl. No.: 17/250,976

(22) PCT Filed: Oct. 2, 2019

(86) PCT No.: PCT/US2019/054225
§ 371 (c)(1),
(2) Date: Apr. 6, 2021

(87) PCT Pub. No.: WO2020/076577
PCT Pub. Date: Apr. 16, 2020

(65) Prior Publication Data
US 2021/0395555 A1    Dec. 23, 2021

Related U.S. Application Data

(60) Provisional application No. 62/742,608, filed on Oct. 8, 2018.

(51) Int. Cl.
*C09D 5/02* (2006.01)
*C08K 5/00* (2006.01)
(Continued)

(52) U.S. Cl.
CPC .............. *C09D 133/04* (2013.01); *C08K 5/00* (2013.01); *C09D 5/024* (2013.01); *C09D 7/42* (2018.01); *C09D 7/68* (2018.01); *C09D 7/69* (2018.01)

(58) Field of Classification Search
CPC ... C09D 7/42; C09D 7/68; C09D 7/69; C09D 5/024; C09D 133/04; C08K 5/00
See application file for complete search history.

(56) References Cited

U.S. PATENT DOCUMENTS

| 7,829,626 B2 | 11/2010 | Chiou et al. |
| 8,900,669 B2 | 12/2014 | Lafleur et al. |
(Continued)

FOREIGN PATENT DOCUMENTS

| AU | 2012207027 A1 * | 3/2013 | ........... C09D 201/00 |
| CN | 104861808 A | 8/2015 | |
(Continued)

OTHER PUBLICATIONS

Howater et al., Surface Modification of Polymers with 3-Aminopropyltriethoxysilane as a General Pretreatment for Controlled Wettability, Macromolecules 2007, 40, 1128-1132.*

*Primary Examiner* — Jun Li
(74) *Attorney, Agent, or Firm* — Boyle Fredrickson, S.C.

(57) ABSTRACT

The present disclosure provides a process. In an embodiment, the process includes forming an aqueous matte coating composition including A1) beads of a first acrylic polymer having an average particle diameter from 0.1 μm to 2 μm; A2) beads of a second acrylic polymer having an average particle diameter from 0.5 μm to 30 μm; B) an acrylic polymer binder; C) from 0.15 wt % to 2.5 wt % of a slip additive; D) from 0.10 wt % to 0.30 wt % of a defoaming agent; E) from 0.8 wt % to 1.5 wt % of a rheology modifier; and F) from 0.01 wt % to 0.1 wt % of at least one
(Continued)

wetting agent. The aqueous matte coating composition is applied to a substrate and then dried to form a coating on the substrate.

13 Claims, 1 Drawing Sheet

(51) Int. Cl.
    *C09D 7/40*     (2018.01)
    *C09D 7/42*     (2018.01)
    *C09D 133/04*     (2006.01)

(56) References Cited

U.S. PATENT DOCUMENTS

| | | | |
|---|---|---|---|
| 9,410,053 B2 | 8/2016 | Kamel et al. | |
| 11,505,715 B2 * | 11/2022 | Guo | C09D 151/06 |
| 2002/0082344 A1 * | 6/2002 | Ishihara | B05D 7/532 |
| | | | 525/29 |
| 2002/0147253 A1 * | 10/2002 | Kita | C08K 5/10 |
| | | | 523/206 |
| 2006/0121289 A1 | 6/2006 | Robertson | |
| 2013/0052357 A1 * | 2/2013 | Lafleur | C09D 7/42 |
| | | | 524/188 |
| 2014/0287135 A1 | 9/2014 | Caruthers et al. | |
| 2015/0197659 A1 | 7/2015 | Kamel | |
| 2016/0115341 A1 | 4/2016 | Xu et al. | |
| 2016/0289496 A1 * | 10/2016 | Hoehne | C09D 177/02 |
| 2017/0166752 A1 | 6/2017 | Kriha | |
| 2019/0315994 A1 | 10/2019 | Guo et al. | |
| 2019/0338143 A1 | 11/2019 | Kriha | |

FOREIGN PATENT DOCUMENTS

| | | | |
|---|---|---|---|
| CN | 108330732 A | 7/2018 | |
| EP | 3165092 A1 * | 5/2017 | ............. A01N 25/00 |
| JP | 2002212490 A * | 7/2002 | |
| JP | 2004-156025 A | 6/2004 | |
| JP | 2005187701 A * | 7/2005 | |
| WO | WO-2018071088 A1 * | 4/2018 | ............. C08G 18/83 |

\* cited by examiner

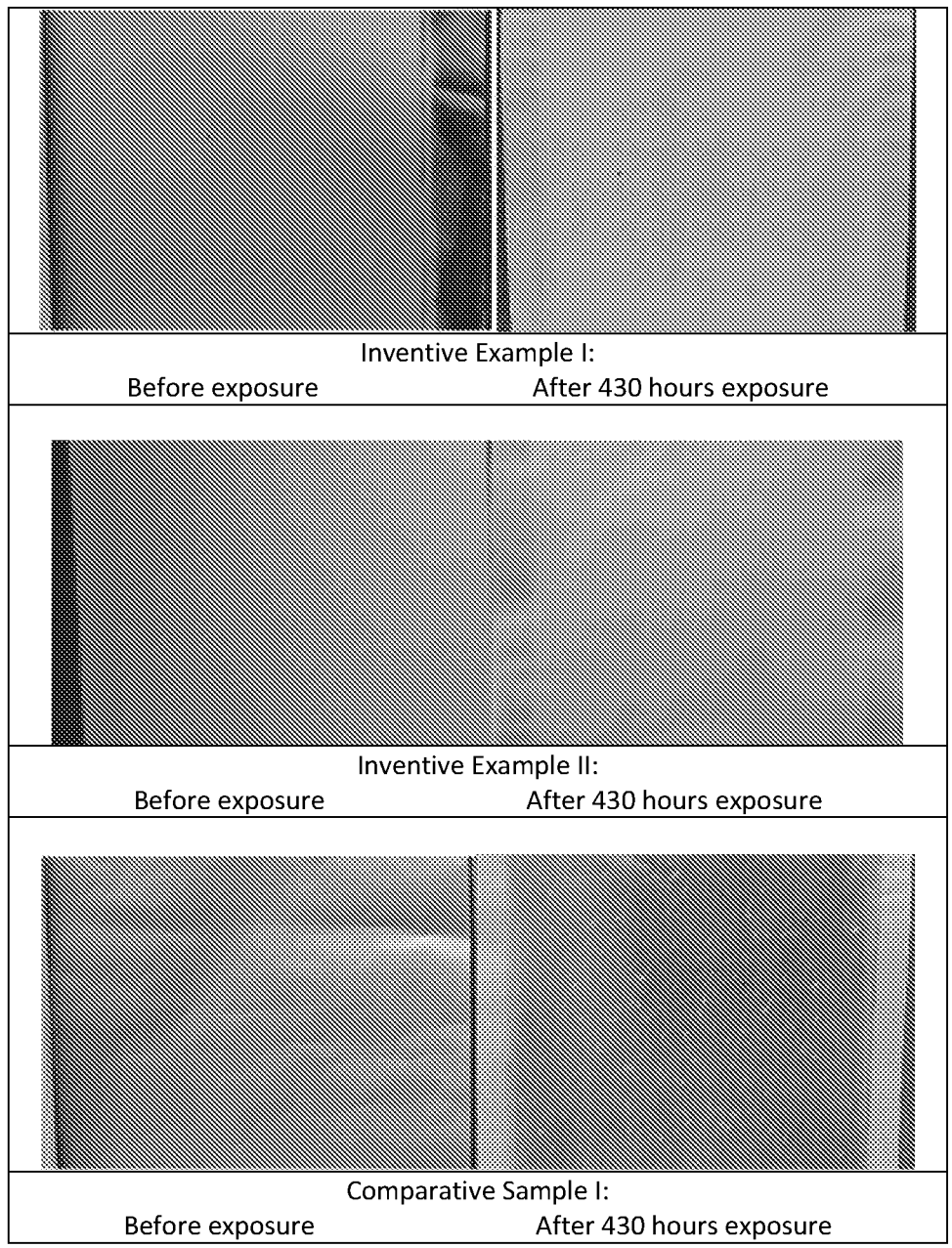

PROCESS FOR PRODUCING A COATED SUBSTRATE

BACKGROUND

Matte finishes are commonly used in packaging applications (e.g., food packaging applications) to alter the functionality and/or appearance of the packaging. For example, matte finishes can enhance optical appearance such as gloss reduction and color retention, touch or tactile response, ink and image protection for direct printing, and processability. Currently, most matte finishes are formulated from inorganic fillers, such as silica, with acrylic and/or polyurethane binders, either solvent-borne or waterborne. However, existing matte finishes exhibit low color fidelity and weak abrasion resistance in, e.g., both gravure and flexographic printing application areas.

Recently, matte finishes incorporating polyurethane beads have addressed soft touch, improved color fidelity, and abrasion resistance issues encountered by previous matte finishes. However, polyurethane beads are relatively expensive and have heat seal resistance concerns. Even more recently, matte finishes including acrylic beads and aminosilanes have been used to address the issues noted above. However, even the incorporation of these acrylic beads and aminosilanes have not fully addressed the unmet needs of customers. Accordingly, aqueous matte coating compositions providing improved gloss and color values retention under UV exposure (weatherability) while maintaining coefficient of friction are desirable.

SUMMARY

The present disclosure provides a process. In an embodiment, the process includes forming an aqueous matte coating composition including A1) beads of a first acrylic polymer having an average particle diameter from 0.1 μm to 2 μm; A2) beads of a second acrylic polymer having an average particle diameter from 0.5 μm to 30 μm; B) an acrylic polymer binder; C) from 0.15 wt % to 2.5 wt % of a slip additive; D) from 0.10 wt % to 0.30 wt % of a defoaming agent; E) from 0.8 wt % to 1.5 wt % of a rheology modifier; and F) from 0.01 wt % to 0.1 wt % of at least one wetting agent. The aqueous matte coating composition is applied to a substrate and then dried to form a coating on the substrate.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges of 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" and "polymer blend" refer to an intimate physical mixture (that is, without reaction) of two or more polymers. A blend may or may not be miscible (not phase separated at molecular level). A blend may or may not be phase separated. A blend may or may not contain one or more domain configurations after drying, as determined from techniques including, but not limited to, transmission electron spectroscopy, light scattering, x-ray scattering. The blend may be effected by physically mixing the two or more polymers on the macro size level (for example, cold blending materials) or the micro level (for example, simultaneous forming within the same reactor).

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The term "crosslinkable" indicates that a polymer, before or after shaped into an article, is not cured or crosslinked and has not been subjected or exposed to treatment that has induced substantial crosslinking although the polymer comprises additive(s) or functionality which will cause, promote, or enable substantial crosslinking upon subjection or exposure to such treatment (e.g., exposure to moisture or water).

The term "crosslinking agent" refers to a chemical agent that forms bonds between polymer materials and substrates.

The term "defoaming or anti-foaming agent" refers to a chemical agent or additive that lowers the amount of foam formed in a liquid or aqueous composition during mixing.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random and block copolymers. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of corresponding monomers.

The term "rheology modifier" refers to a chemical agent or additive that, when added to a fluid or fluid composition, changes the rheological properties of the fluid or fluid composition.

The term "viscosity" refers to the resistance of a fluid which is being deformed by either shear stress or tensile stress.

The term "wetting agent" refers to a chemical agent or additive that, when added to a fluid or fluid composition, lowers the surface tension of the fluid or fluid composition.

Test Methods

Color measurement is the measurement of absorption of light by a material.

Color measurement is determined using a Datacolor color spectrophotometer, model SF600 CT Plus. Color measurement is reported in critical micelle concentration (CMC) value.

Coefficient of Friction (COF) is determined using a TMI Friction and Slip Tester Model 32-06-00 at 25° C. and 50% relative humidity (RH).

Gloss measurement is the measurement of reflection of light from a surface. Gloss measurement is measured at 60° and 85° using a BYK gloss meter micro-TRI-gloss model. Gloss measurement is reported in gloss units (GU). Gloss measurement is independent of the thickness of a coating on a substrate if the coating uniformly covers the substrate and is defect-free. The average thickness of the coating for the present examples is from 1 μm to 3 μm.

Heat seal resistance of the coatings is evaluated by the V-Fold heat resistance test with a heat sealer at 400° F., 40 psi, and 2 second duration time. After heat sealing, a "pass" result is determined if (i) no adhesion occurs between the coating and the substrate, (ii) no matte coating is removed after heat sealing, or (iii) if no change in gloss occurs. A "fail" result is determined if (i) the coated side of the substrates remain stacked together, (ii) the matte coating has peeled off or delaminated from the substrate, or (iii) if a change in gloss occurs.

Particle size diameter, for diameters ranging from 0.5 microns to 30 microns herein, is determined using a Disc Centrifuge Photosedimentometer ("DCP") (available from CPS Instruments, Inc.). Modes of particles are separated by centrifugation and sedimentation through a sucrose gradient. The samples are prepared by adding 1 to 2 drops into 10 cc of deionized water containing 0.1% sodium lauryl sulfate. Then, 0.1 cc of the sample is injected into the spinning disc filled with 15 cc of sucrose gradient. Samples are analyzed relative to a polystyrene calibration standard. The specific conditions are: a sucrose gradient from 2% to 8% and a disc speed of 10,000 rpm. The calibration standard is 895 nm diameter polystyrene.

Tape adhesion is determined using Scotch 610 tape, by adhering the tape firmly onto the matte coating surface and peeling off the tape quickly. The adhesion is rated by visual observation of the coating surface. If no coating is removed or no defects occur, a score of 5 is assigned. If less than 5% of the coating is removed, a score of 5 is assigned. If less than 10% of the coating is removed, a score of 4 is assigned. If less than 20% of the coating is removed, a score of 3 is assigned. If less than 30% of the coating is removed, a score of 2 is assigned. If less than 40% of the coating is removed, a score of 1 is assigned.

Sutherland rub resistance measures the ability of a material to resist abrasion. Sutherland rub resistance is determined using a Sutherland Ink Rub Tester with either a 4 lb weight pad at running speed 2 (1 cycle/second). All coated substrates are allowed to cure at room temperature for one week before conducting the test. The data is recorded based on 50 cycle times per read.

Viscosity is measured at room temperature (25° C.) using a Brookfield viscometer DV I with spindle #2.

Weatherability is a measure of the durability of a coated substrate to withstand damage caused by external environmental exposure (e.g. sunlight, moisture, elevated temperature). Weatherabilty is measured using a Q-Lab accelerated weathering tester, Model QUV/SE (hereafter, QUVA). The weathering method consists of two segments: a UV exposure segment and a water condensation segment. The first segment is a light cycle lasting 8 hours with continuous ultraviolet A (UVA) exposure at a controlled irradiance of 0.77 W/m$^2$ at 340 nm and black panel at a temperature of 60° C. Irradiance is a measure of the intensity of UV light. The second segment is a dark cycle lasting 4 hours with water condensation formed on test specimens, and the black panel temperature is controlled at 40° C. The total of 8 hours of light cycle plus 4 hours of dark cycle constitutes a full, two segment weathering cycle equaling a total of 12 hours. The 12-hour two segment weathering cycle is repeated 36 times for a total testing time duration of 430 hours. This method is technically similar to ASTM G154 cycle 1 with slight changes in irradiance level and black panel temperature. Table 1 summarizes the weathering test method.

TABLE 1

|  | Segment 1 | Segment 2 |
| --- | --- | --- |
| Duration (hours) 430 hours | 8 | 4 |
| Segment description | UV light | Dark + Condensation |
| Irradiance Level (W/m$^2$) | 0.77 | — |
| Black Panel Temperature (° C.) | 60 | 40 |
| Other/Comments | Method provided by customer | |

BRIEF DESCRIPTION OF FIGURES

FIG. 1 depicts a comparison of the coating appearance of two Inventive Examples and a first Comparative Sample (i) before QUVA exposure and (ii) after 430 hours of QUVA exposure.

DETAILED DESCRIPTION

The present disclosure provides a process. The process includes forming an aqueous matte coating composition. The aqueous matte coating composition includes A1) beads of a first acrylic polymer having an average particle diameter from 0.1 μm to 2 μm, A2) beads of a second acrylic polymer having an average particle diameter from 0.5 μm to 30 μm, B) an acrylic polymer binder, C) from 0.15 to 2.5 wt % of a slip additive, D) from 0.10 to 0.30 wt % of a defoaming agent, E) from 0.8 wt % to 1.5 wt % of a rheology modifier, and F) from 0.01 wt % to 0.1% of at least one wetting agent. The aqueous matte coating composition is then applied to a substrate. The aqueous matte coating composition is then dried to form a coating on the substrate.

A1. Beads of a First Acrylic Polymer

The aqueous matte coating composition includes beads of a first acrylic polymer. The beads of the first acrylic polymer are formed from a combination of uniform acrylic beads with an acrylic-based carrier emulsion. The beads of the first acrylic polymer have an average particle diameter from 0.1

μm to 2 μm, Tg from −30° C. to −5° C. Additional properties include, but are not limited to, a solids content ranging from 30% to 40%, and a viscosity ranging from 100 cP to 1000 cP. Furthermore, the beads of the first acrylic polymer have an anionic electrical charge.

In an embodiment, the beads of the first acrylic polymer are present in an amount from 20 wt % to 30 wt %, based on total weight of the aqueous matte coating composition.

Non-limiting examples of beads of the first acrylic polymer include Opulux 3001 available from the Dow Chemical Company.

A2) Beads of a Second Acrylic Polymer

The aqueous matte coating composition further includes beads of a second acrylic polymer. The beads of the second acrylic polymer are formed from a combination of uniform acrylic beads with an acrylic-based carrier emulsion. The composition of the second acrylic polymer is different from the composition of the first acrylic polymer. The beads of the second acrylic polymer have an average particle diameter from 0.5 μm to 30 μm and Tg from −50° C. to −20° C.

In an embodiment, the average particle diameter of the beads of the second acrylic polymer is larger than the average particle diameter of the beads of the first acrylic polymer. The beads of the second acrylic polymer have a solids content ranging from 30% to 40%, a viscosity ranging from 100 cP to 1000 cP and an anionic electrical charge. In an embodiment, the beads of the second acrylic polymer are present in an amount from 45 wt % to 55 wt %, based on total weight of the aqueous matte coating composition.

Non-limiting examples of beads of the second acrylic polymer included Opulux 3501 available from the Dow Chemical Company.

B) Acrylic Polymer Binder

The aqueous matte coating composition includes an acrylic polymer binder having an average particle diameter from 0.03 μm to 0.5 μm, or from 0.1 μm to 0.5 μm. The acrylic polymer binder is present in an amount from 10 wt %, or 15 wt % to 25 wt %, or 30 wt % of the aqueous matte coating composition, based on total weight of the aqueous matte coating composition. In an embodiment, the acrylic polymer binder is present in an amount from 10 wt % to 30 wt %, or from 15 wt % to 25 wt %.

In an embodiment, the acrylic polymer binder includes at least one nonionic ethylenically unsaturated monomer copolymerized with suitable comonomers including but not limited to methyl methacrylate, methyl acrylate, ethyl acrylate, ethylene-methyl acrylate, butyl acrylate, and butyl methacrylate. The acrylic polymer binder is uncrosslinked.

Non-limiting examples of the acrylic polymer binder include EXP 5612 (or Opulux 1000), an acrylic binder available from the Dow Chemical Company.

C) Slip Additive

The aqueous matte coating composition includes a slip additive. In an embodiment, the slip additive is present in an amount from 0.15 wt %, or 0.35, wt %, or 0.55 wt %, or 0.75 wt % to 1.9 wt %, or 2.1 wt %, or 2.3 wt %, or 2.5 wt % of the aqueous matte coating composition, based on total weight of the aqueous matte coating composition. In an embodiment, the slip additive is present in an amount from 0.15 wt % to 2.5 wt %, or from 0.35 wt % to 2.3 wt %, or from 0.55 wt % to 2.1 wt %, or from 0.75 wt % to 1.9 wt %.

In an embodiment, the slip additive comprises i) a silicone emulsion and ii) an amide wax dispersion.

i) Silicone Emulsion

In an embodiment, the slip additive includes a silicone emulsion. Suitable silicone emulsions include, but are not limited to, polydimethylsiloxane ("PDMS")-based emulsions, polydiethylsiloxane ("PDES")-based emulsions, other emulsified silicone polymer and silicone copolymer products and combinations thereof, such as PDMS-based emulsions which are readily dispersible in water.

The silicone emulsion has a solids content ranging from 45% to 85%, and a percent actives content ranging from 30% to 65%. The viscosity of the silicone emulsion additive ranges from 1,000 cP to 700,000 cP.

In an embodiment, the silicone emulsion is present in the aqueous matte coating composition in an amount from 0.1 wt %, or 0.2 wt %, or 0.3 wt %, or 0.4 wt %, or 0.5 wt %, to 0.6 wt %, or 0.7 wt %, or 0.8 wt %, or 0.9 wt %, or 1.0 wt %. In an embodiment, the silicone emulsion is present in the aqueous matte coating composition in an amount from 0.1 wt % to 1.0 wt %, or from 0.2 t % to 0.9 wt %, or from 0.3 wt % to 0.8 wt %, or from 0.4 wt % to 0.7 wt %, or from 0.5 wt % to 0.6 wt %.

Non-limiting examples of suitable silicone emulsions include silicone emulsions sold by ICM Products Inc., such as TE 352 FG™, EM 350, ICM 3563FG, and by DowCorning, such as DC-24 silicone emulsion, Dowsil-51, Dowsil-52, and Dowsil 210S. The silicone emulsion is used by individual product or by mixtures thereof.

ii) Amide Wax Dispersion

In an embodiment, the slip additive includes an amide wax dispersion. The amide wax is an alkyl secondary amide wax such as ethylene-bis-stearamide aqueous dispersion with a solids content from 30 wt % to 60 wt %.

The viscosity of the amide wax dispersion ranges from 500 cP to 1500 cP, and pH ranges from 6.0 to 9.0. The amide wax dispersion is in a liquid form.

In an embodiment, the amide wax is a solid powder which is then dispersed in water-based coatings.

In an embodiment, the amide wax dispersion is present in the aqueous matte coating composition in an amount from 0.5 wt %, or 0.7 wt %, or 0.9 wt %, to 1.0 wt %, or 1.2 wt %, or 1.5 wt %. In an embodiment, the amide wax dispersion is present in the aqueous matte coating composition in an amount from 0.5 wt % to 1.5 wt %, or from 0.7 wt % to 1.2 wt %, or from 0.9 wt % to 1.0 wt %.

Non-limiting examples of suitable alkyl secondary amide waxes include waxes sold under the HYDROCER™ and S-400 N5™ trade names by Shamrock Technologies.

D) Defoaming Agent

The aqueous matte coating composition includes a defoaming agent. The defoaming agent is self-emulsifying, and is free of both silicone and silica. The density of the defoaming agent ranges from 0.80 g/cc to 1.05 g/cc. The defoaming agent also has a viscosity ranging from 100 cP to 1000 cP.

In an embodiment, the defoaming agent is present in an amount from 0.10 wt %, or 0.12 wt %, or 0.15 wt %, to 0.20 wt %, or 0.25 wt %, or 0.30 wt % based on total weight of the aqueous matte coating composition. In an embodiment, the defoaming agent is present in an amount from 0.10 wt % to 0.30 wt %, or from 0.12 wt % to 0.25 wt %, or from 0.15 wt % to 0.20 wt %.

Non-limiting examples of the defoaming agent include TEGO™ Anti foam 2291 available from Evonik, which is non-silicone based defoamer based on modified mineral oil.

E) Rheology Modifier

The aqueous matte coating composition includes a rheology modifier. The rheology modifier is non-ionic. The solids content of the rheology modifier is from 15 wt % to 25 wt %. The viscosity of the rheology modifier is from 1000 cP to 3800 cP.

The rheology modifier is present in the aqueous matte coating composition in an amount from 0.8 wt %, or 0.9 wt %, or 1.0 wt %, or 1.1 wt % to 1.2 wt %, or 1.3 wt %, or 1.4 wt %, or 1.5 wt %, based on total weight of the aqueous matte coating composition. In an embodiment, the rheology modifier is present in an amount from 0.8 wt % to 1.5 wt %, or from 0.9 wt % to 1.4 wt %, of from 1.0 wt % to 1.3 wt %, or from 1.1 wt % to 1.2 wt %.

Non-limiting examples of suitable rheology modifiers include Acrysol RM 2020E available from Dow Chemical Company.

F) Wetting Agent

The aqueous matte coating composition includes at least one multi-type wetting agent, present in an amount from 0.01 wt %, or 0.02 wt %, or 0.03 wt % or 0.04 wt %, or 0.05 wt %, to 0.06 wt %, or 0.07 wt %, or 0.08 wt %, or 0.09 wt %, or 0.1 wt %, based on total weight of the aqueous matte coating composition. In an embodiment, the wetting agent is present in an amount from 0.01 wt % to 0.1 wt %, or from 0.02 wt % to 0.09 wt %, or from 0.03 wt % to 0.08 wt %, or from 0.04 wt % to 0.07 wt %, or from 0.05 wt % to 0.06 wt %.

Non-limiting examples of suitable wetting agents include sodium lauryl sulfate, sodium dodecylbenzene sulfonate, di-2-ethylhexyl sodium sulfosuccinate, and mixtures thereof.

In an embodiment, the aqueous matte coating composition is formed by adding together the beads of the first acrylic polymer, the beads of the second acrylic polymer, the silicone emulsion, the amide wax, and the polymer binder under low shear stirring. Other coating additives may be added as desired.

In an embodiment, the silicone emulsion and the amide wax dispersion of the slip additive are post-blended with the beads of both the first acrylic polymer and the second acrylic polymer, the defoaming agent, the acrylic polymer binder, the rheology modifier, and the wetting agent.

The aqueous matte coating composition may contain additives in addition to the beads of both the first acrylic polymer and the second acrylic polymer, and the slip additive. Such additives include, but are not limited to, a film-forming solution, a non-film-forming solution, or emulsion polymers. The properties of such additives are different from the properties of the first acrylic polymer and the second acrylic polymer. The additives are present in an amount from 0 wt %, or greater than 0 wt %, or 1 wt %, or 5 wt %, to 10 wt %, or 20 wt %, or 30 wt % of the sum of the beads of the first acrylic polymer and the second acrylic polymer. In an embodiment, the additives are present in an amount from 0 wt % to 30 wt %, or from 1 wt % to 20 wt %, or from 5 wt % to 10 wt %.

Other additives such as coating additives include, but are not limited to, emulsifiers, coalescing agents, antifreezes, curing agents, buffers, neutralizers, thickeners, humectants, and plasticizers.

The weight ratio of the beads of the second acrylic polymer to the beads of the first acrylic polymer is from 80:20 to 60:40, or from 70:30 to 60:40.

In an embodiment, drying of the aqueous matte coating composition occurs under ambient conditions, i.e. at 25° C. Alternatively, the coating may be dried at an elevated temperature, i.e. from 35° C. to 150° C.

The solids content of the aqueous matte coating composition may be from 10 wt % to 70 wt %, or from 20 wt % to 50 wt %, or from 30 wt % to 40 wt % by weight. Solids content is measured with a Mettler Toledo moisture analyzer. The viscosity of the aqueous matte coating composition may be from 20 seconds to 50 seconds, or from 25 seconds to 35 seconds, at 25° C. as measured using a Signature Gardner Zahn viscosity cup #2.

Coating

The aqueous matte coating composition is applied to a substrate to form a coating on the substrate. Nonlimiting examples of the material for the substrate include polyester (PET), oriented polypropylene (OPP), Nylon, polyethylene (PE), paper, foil, and metalized films thereof.

The aqueous matte coating composition may be applied to the substrate using gravure printing technology or flexographic printing technology or offset printing technology. Coating application methods also include, but are not limited to, hand drawdown with a hand proofer or a Meyer rod, paint brush, paint roller, curtain coater. The aqueous matte coating composition may be applied by spraying. Spraying methods include, but are not limited to, air-atomized spray, air-assisted spray, airless spray, high volume low pressure spray, and air-assisted airless spray.

In an embodiment, the aqueous matte coating composition is applied to the substrate using a Labcombi pilot coater with a gravure cylinder. A smoothing bar is then applied to ensure evenness of thickness of the aqueous matte coating composition. The aqueous matte coating composition is applied to the substrate using a Labcombi pilot coater with a gravure cylinder without smoothing bar when the coating speed above 400 ft/min.

In an embodiment, the aqueous matte coating composition is incorporated with from 0.5 to 5 parts of a crosslinking agent, such as water dispersible aliphatic polyisocyanate with 100% solid content by directly mixing into the matte coating with an overhead mixer before applying it onto a substrate. The aqueous matte coating composition is then applied to the substrate and allowed to dry. The result is a crosslinked coating on the substrate. The dried coating basis weight ranges from 0.9 grams per square meter (gsm) to 3.2 gsm.

The process includes forming a crosslinked coating on a substrate.

In an embodiment, the crosslinked coating on the substrate has one, some, or all of the following properties:
(i) a percent change in gloss value, measured at 60° and 430 hours, of less than 15%; and/or
(ii) a percent change in gloss value, measured at 85° and 430 hours of less than 15%; and/or
(iii) a static coefficient of friction, measured at 25° C. and 50% relative humidity, from 2.0 to 2.6; and/or
(iv) a kinetic coefficient of friction, measured at 25° C. and 50% relative humidity, from 1.0 to 1.5; and/or
(v) a tape adhesion (Scotch 610) from 4 to 5, wherein the term "percent change in gloss value," as used herein, refers to the magnitude of difference between final gloss value at 430 hours when weatherability testing is complete and initial gloss value at 0 hours before weatherability testing commences, divided by the initial gloss value at 0 hours before weatherability testing commences.

In an embodiment, the crosslinked coating on the substrate has a percent change in gloss value, measured at 60° and 430 hours, from 1% to 15%, or from 5% to 15%, or from 9% to 15%.

In an embodiment, the crosslinked coating on the substrate has a percent change in gloss value, measured at 85° and 430 hours, from 1% to 15%, or from 5% to 15%, or from 9% to 15%.

In an embodiment, the crosslinked coating on the substrate has a change in gloss units, measured at 60° and 430 hours, from 0 to 3. The term "change in gloss units," or "change in GU," as used herein, refers to the magnitude of difference between final gloss value at 430 hours when weatherability testing is complete and initial gloss value at 0 hours before weatherability testing commences. In an embodiment, the crosslinked coating on the substrate has a change in gloss units, measured at 60° and 430 hours, from 1 to 2.

In an embodiment, the crosslinked coating on the substrate has a change in gloss units, measured at 85° and 430 hours, from 0 to 3. In an embodiment, the crosslinked coating on the substrate has a change in gloss units, measured at 85° and 430 hours, from 1 to 2.

In an embodiment, the crosslinked coating on the substrate has a Sutherland rub resistance greater than 1000 cycle times.

Applicant unexpectedly discovered that the Inventive Example I and Inventive Example II versus the Comparative Sample I results in improved weatherability (gloss and color retention) of the crosslinked coating, with an improved static and kinetic coefficient of friction for each of the Inventive Examples. Bound by no particular theory, it is believed that coated substrates with a crosslinked coating formed from a defoaming agent in an amount from 0.1 wt % to 0.3 wt %, have an improved processability and better weatherability compared to crosslinked coatings having less than 0.1 wt % defoaming agent.

By way of example, and not limitation, an embodiment of the present disclosure will now be described in detail in the following Examples.

EXAMPLES

Materials used in the Examples are provided in Table 2 below.

TABLE 2

| Raw materials | Function | Supplier |
|---|---|---|
| Opulux ™ 3000/3001 | Acrylic beads | Dow Chemical Company |
| Opulux ™ 3500/3501 | Acrylic beads | Dow Chemical Company |
| EXP 5612 (Opulux ™ 1000) | Acrylic binder | Dow Chemical Company |
| TEGO ™ Anti-foam 2291 | Defoaming agent | Evonik Industries |
| TEGO ™ Foamex 1488 | Defoaming agent | Evonik Industries |
| TRITON ™ GR-5M | Wetting agent | Dow Chemical Company |
| Sodium lauryl sulfate | Wetting agent | Sigma Aldrich Corporation |
| Sodium dodecyl benzene sulfate | Wetting agent | Sigma Aldrich Corporation |
| Aqua Ammonia BE 26 | pH adjuster | Dow Chemical Company |
| ACRYSOL ™ RM-2020E | Rheology modifier | Dow Chemical Company |
| ACRYSOL ™ RM-8W | Rheology modifier | Dow Chemical Company |
| DI Water | | Dow Chemical Company |
| Dowsil 51 | Silicone emulsion additive | Dow Chemical Company |
| TE-352 FG | Silicone emulsion additive | ICM |
| HYDROCER ™ 145 | Wax | Shamrock Technologies |
| Water dispersible polyisocyanate CR 9-101 | Crosslinking agent | Dow Chemical Company |

Comparative Sample I is a polyurethane dispersion based matte coating obtained from an outside supplier.

The formulations for Inventive Example I, Inventive Example II, and Comparative Sample II, along with test results for both of the Inventive Examples and both of the Comparative Samples, are shown in Table 3 below.

The aqueous matte coating composition is prepared by loading the acrylic beads dispersion of both the first acrylic polymer and the second acrylic polymer in a container. The defoaming agent is then added under agitation. The acrylic binder is then added. The pH of the mixture is adjusted with ammonia, and then the rheology modifier is slowly added under agitation. Mixing is continued for 15 to 20 minutes, with the wetting agent and other additives finally being added, and mixing continued for 20 more minutes.

Before applying the aqueous matte coating composition to the substrate for each of the Inventive Examples and Comparative Sample II, 0.5 parts of water dispersible polyisocyanate, CR 9-101 (crosslinking agent), per hundred parts wet material is added into the formulated aqueous matte coating composition under overhead agitation. Mixing then occurs for 20 minutes before application to the substrate.

Each of the Inventive Example compositions and Comparative Sample II is coated to a 92 gauge PET substrate by a Labcombi pilot coater at a coating rate of 400 ft/min, with a 180 Q/7.5 BCM volume gravure cylinder. A smoothing bar is run over the coating to ensure uniform appearance. The thickness of the uniform coating is from 0.1 μm to 0.3 μm. The final dried coating basis weight is from 0.9 gsm to 3.2 gsm.

The PET substrate is subjected to three drying zones. The drying oven temperature of the three zones was 170° F./180° F./190° F. The PET substrate is in-situ treated with corona treatment of 1 kilowatt before coating with the aqueous matte coating composition. The coated substrates are then stored under 25° C. and 50% RH for one week before performance testing.

Performance testing is done using the test methods described previously.

TABLE 3

| Material | Inventive Example I (g) | Inventive Example II g) | Comparative Sample I (g) | Comparative Sample II (g) |
|---|---|---|---|---|
| EXP 5612 (Opulux ™ 1000), acrylic binder | 20.00 | 18.62 | N/A | 18.65 |
| Opulux ™ 3001 (acrylic beads) | 25.00 | 25.28 | N/A | — |
| Opulux ™ 3501 (acrylic beads) | 51.00 | 51.24 | N/A | — |
| Opulux ™ 3000 (acrylic beads) | — | — | N/A | 25.32 |
| Opulux ™ 3500 (acrylic beads) | — | — | N/A | 51.32 |
| TEGO ™ Anti foam 2291 (Defoaming agent) | 0.20 | 0.20 | N/A | — |
| TEGO ™ Foamex 1488 (Defoaming agent) | — | — | N/A | 0.05 |
| Triton ™ GR-5M 5M (wetting agent) | 0.05 | 0.05 | N/A | 0.05 |
| Sodium lauryl sulfate (wetting agent) | 0.05 | — | N/A | — |
| Sodium dodecyl benzene sulfate (wetting agent) | 0.01 | — | N/A | — |

TABLE 3-continued

| Material | Inventive Example I (g) | Inventive Example II (g) | Comparative Sample I (g) | Comparative Sample II (g) |
|---|---|---|---|---|
| Ammonia (pH adjuster) | 0.12 | 0.12 | N/A | 0.12 |
| Acrysol ™ RM-2020E (rheology modifier) | 1.16 | 1.15 | N/A | — |
| Acrysol ™ RM-8W (rheology modifier) | — | — | N/A | 1.15 |
| Total DI water | 0.48 | 0.33 | N/A | 0.33 |
| Dowsil 51 (58.3%) (silicone emulsion) | 0.70 | — | N/A | — |
| TE-352-FG (DC) (silicone emulsion) | — | 1.15 | N/A | 1.15 |
| HYDROCER ™ 145, (50%) (Amide wax) | 1.21 | 1.86 | N/A | 1.86 |
| Total** | 100.00 | 100.00 | N/A | 100.00 |
| Solid content (%) | 33 | 32 | N/A | 32 |
| Coating Performance | | | | |
| Coating basis weight (g/m²) | 1.2 | 0.75 | 2.0 | 0.9 |
| Static COF | 2.173 | 2.513 | 1.052 | 1.480 |
| Kinetic COF | 1.090 | 1.182 | 0.743 | 0.763 |
| Sutherland Rub (cycle times, 4 lb. weight) | >1000 | >1000 | >400 | >1000 |
| Tape adhesion (Scotch 610) | 5 | 5 | 4 | 3 |
| Thermal resistance (400° F., 40 psi, 2 sec) | Pass | Pass | Pass | Pass |
| Gloss and Color Test Results | | | | |
| Substrate | 92 gauge PET | 92 gauge PET | 92 gauge PET | PET |
| Coating basis weight (g/m²) | 1.0 | 0.75 | 1.1 | N/A |
| Gloss 60°, QUVA 0 hours | 11.2 | 11.5 | 8.6 | 9.3 |
| Gloss 60°, QUVA 430 hours | 9.6 | 10.4 | 24.2 | N/A |
| Gloss 60°, % change/change in GU*** | −14.3%/−1.6 | −9.6%/−1.1 | | |
| Gloss 85°, QUVA 0 hours | 4.8 | 6.7 | 26.7 | N/A |
| Gloss 85°, QUVA 430 hours | 5.5 | 7.1 | 62.3 | 3.3 |
| Gloss 85°, % change/change in GU*** | 14.6%/0.7 | 5.9%/0.4 | | |
| Color (CMC value) QUVA 0 hours | 0 | 0 | 0 | N/A |
| Color (CMC value) QUVA 430 hours | 2.398 | 2.100 | 1.511 | N/A |

*Not Tested
**Amounts based on weight percent
***GU = Gloss Units

Each of the Inventive Examples has an improved adhesion over each of the Comparative Samples. Each of the Inventive Examples also has improved static and kinetic coefficient over each of the Comparative Samples. With respect to weatherability, each of the Inventive Examples has minimal change in both 60° and 85° gloss values whereas Comparative Sample I shows appreciable higher gloss values after QUVA testing. A higher gloss value post weathering test is indicative of gradual loss of matte coating, or lower weatherability. As shown in FIG. 1, the matte coating of Comparative Sample I is gradually etched away during the weatherability test. Comparative Sample I shows lower color change value with respect to each of the Inventive Examples. This is due to the fact that the matte coating in Comparative Sample I is etched during UV exposure, and thus the glossy and transparent PET substrate underneath the matte coating is exposed.

FIG. 1 depicts that the crosslinked coatings of Inventive Example I and Inventive Example II each has a better appearance than does the matte coating of Comparative Sample I after 430 hours of QUVA exposure. The crosslinked coatings of each of Inventive Example I and Inventive Example II are better able to withstand weathering simulation than is the matte coating of Comparative Sample I. Each of the Inventive Examples demonstrates that a crosslinked coating, with a greater defoaming agent content than the matte coating of Comparative Sample I, demonstrates an improved performance and durability for external applications of packaging.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
    forming an aqueous matte coating composition comprising
    A1) from 20 wt % to 30 wt % beads of a first acrylic polymer having an average particle diameter from 0.1 µm to 2 µm;
    A2) from 45 wt % to 55 wt % beads of a second acrylic polymer having an average particle diameter from 0.5 µm to 30 µm;
    B) from 15 wt % to 25 wt % of an uncrosslinked acrylic polymer binder having an average particle diameter from 0.03 µm to 0.5 µm;
    C) from 0.15 wt % to 2.5 wt % of a slip additive comprising
        i) a silicone emulsion selected from the group consisting of polydimethylsiloxane-based emulsions and polydiethylsiloxane-based emulsions, and
        ii) an amide wax dispersion;
    D) from 0.10 wt % to 0.30 wt % of a defoaming agent;
    E) from 0.8 wt % to 1.5 wt % of a rheology modifier; and
    F) from 0.01 wt % to 0.1 wt % of at least one wetting agent;
    applying the aqueous matte coating composition to a substrate;
    drying the aqueous matte coating composition; and
    forming a coating on the substrate.

2. The process of claim 1, wherein the slip additive comprises
  i) from 0.1 wt % to 1.0 wt % silicone emulsion; and
  ii) from 0.5 wt % to 1.5 wt % amide wax dispersion, wherein the amide wax is an alkyl secondary amide wax.

3. The process of claim 1 comprising:
  adding a crosslinking agent to the aqueous matte coating composition to form a crosslinkable aqueous matte coating composition;
  applying the crosslinkable aqueous matte coating composition to the substrate; and
  forming a crosslinked coating on the substrate.

4. The process of claim 3 comprising forming a coated substrate having:
  a static coefficient of friction, measured at 25° C. and 50% relative humidity, from 2.0 to 2.6; and
  a kinetic coefficient of friction, measured at 25° C. and 50% relative humidity, from 1.0 to 1.5.

5. The process of claim 1, comprising providing a substrate made from a material selected from the group consisting of polyethylene terephthalate, oriented polypropylene, polyethylene, Nylon, paper, foil, and metalized films thereof.

6. The process of claim 3, wherein the crosslinked coating has a tape adhesion from 4 to 5.

7. The process of claim 3, wherein the crosslinked coating has a percent change in gloss value, measured at 60° and 430 hours, of less than 15%.

8. The process of claim 7, wherein the crosslinked coating has a percent change in gloss value, measured at 85° and 430 hours, of less than 15%.

9. The process of claim 3, wherein the crosslinked coating has a change in gloss units, measured at 60° and 430 hours, from 0 to 3.

10. The process of claim 9, wherein the crosslinked coating has a change in gloss units, measured at 85° and 430 hours, from 0 to 3.

11. The process of claim 10, wherein the crosslinked coating has a color value, measured at 430 hours, from 2.0 to 2.5.

12. A process comprising:
  forming an aqueous matte coating composition comprising
    A1) from 20 wt % to 30 wt % beads of a first acrylic polymer having an average particle diameter from 0.1 μm to 2 μm and having a Tg from −30° C. to −5° C.;
    A2) from 45 wt % to 55 wt % beads of a second acrylic polymer having an average particle diameter from 0.5 μm to 30 μm and having a Tg from −50° C. to −20° C.;
    B) from 15 wt % to 25 wt % of an uncrosslinked acrylic polymer binder having an average particle diameter from 0.03 μm to 0.5 μm;
    C) from 0.15 wt % to 2.5 wt % of a slip additive comprising
      i) a silicone emulsion selected from the group consisting of polydimethylsiloxane-based emulsions and polydiethylsiloxane-based emulsions, and
      ii) an amide wax dispersion, wherein the amide wax is an alkyl secondary amide wax;
    D) from 0.10 wt % to 0.30 wt % of a defoaming agent free of silicone and free of silica;
    E) from 0.8 wt % to 1.5 wt % of a rheology modifier; and
    F) from 0.01 wt % to 0.1 wt % of at least one wetting agent;
  adding a crosslinking agent to the aqueous matte coating composition to form a crosslinkable aqueous matte coating composition;
  applying the crosslinkable aqueous matte coating composition to a substrate;
  drying the crosslinkable aqueous matte coating composition; and
  forming a crosslinked coating on the substrate.

13. The process of claim 12 wherein the crosslinking agent is a water dispersible aliphatic polyisocyanate.

* * * * *